United States Patent [19]
Yazawa et al.

[11] Patent Number: 6,157,739
[45] Date of Patent: Dec. 5, 2000

[54] DISPLAYING FORMAT CONVERTER FOR DIGITALLY ENCODED VIDEO SIGNAL DATA

[75] Inventors: Minobu Yazawa; Shiro Hosotani; Natsuko Matsuo, all of Tokyo, Japan

[73] Assignee: Mitsubishi Denki Kabushiki Kaisha, Tokyo, Japan

[21] Appl. No.: 08/956,368

[22] Filed: Oct. 23, 1997

[30] Foreign Application Priority Data

Jun. 5, 1997 [JP] Japan ..................................... 9-147864

[51] Int. Cl.$^7$ ............................. G06K 9/36; H04N 11/20; H04N 5/91; H04N 7/01
[52] U.S. Cl. .......................... 382/233; 348/441; 348/459; 386/131
[58] Field of Search ..................... 382/233; 348/441–459, 348/460, 461, 465, 474; 386/33, 37, 109, 131

[56] References Cited

U.S. PATENT DOCUMENTS

| | | | |
|---|---|---|---|
| 5,457,499 | 10/1995 | Lim | 348/474 |
| 5,937,095 | 8/1999 | Machida | 382/233 |

FOREIGN PATENT DOCUMENTS 7-7724  1/1995  Japan .

OTHER PUBLICATIONS

A.N.Netravali and B.G.Haskell, "Digital pictures: representation, compression, and standards", 2nd ed., Plenum Publishing Corporation, pp. 626–628, 1995.

*Primary Examiner*—Leo H. Boudreau
*Assistant Examiner*—Dmitry A. Novik
*Attorney, Agent, or Firm*—Burns, Doane, Swecker & Mathis, LLP

[57] ABSTRACT

A decoder for converting packet data into raster data is provided. The packet data includes data about a picture-compressed video signal and data about a picture format including a picture rate. The decoder comprising a first processing means, second processing means and a storage means. The first processing means converts the packet data into intermediate data such that picture compression is eliminated from the picture-compressed video signal and outputs the intermediate data. The second processing means receives the intermediate data from the first processing means and processes the intermediate data to output raster data for one frame at a frame frequency. The storage means stores the intermediate data for processing the intermediate data in the second processing means. The second processing means writes the intermediate data into the storage means at a frequency related to the picture rate and reads the raster data for one frame from the storage means at the frequency equal to the frame frequency.

6 Claims, 14 Drawing Sheets

F I G. 1 0
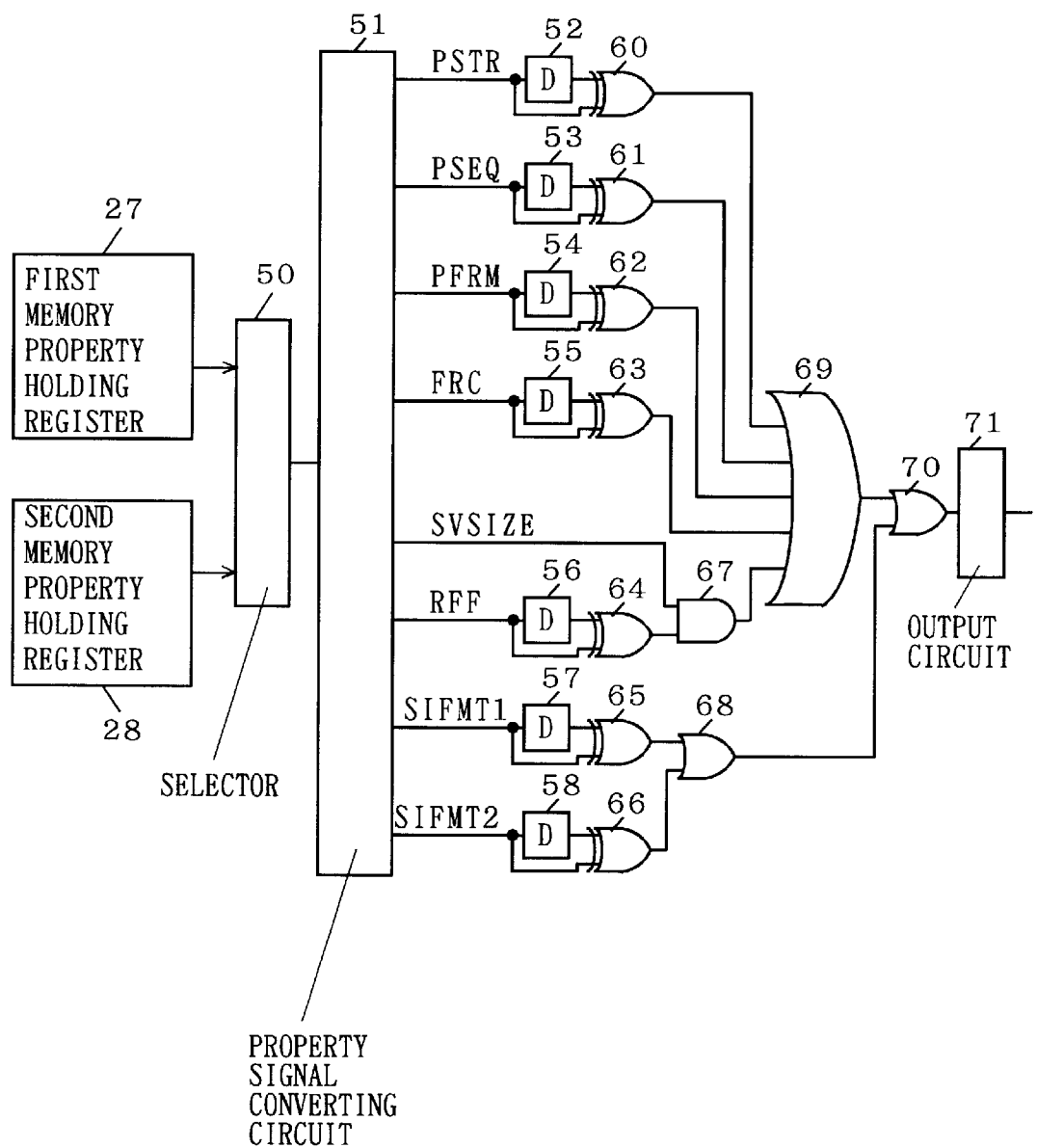

DISPLAYING FORMAT CONVERTER FOR DIGITALLY ENCODED VIDEO SIGNAL DATA

BACKGROUND OF THE INVENTION

1. Field of the Invention

The present invention relates to a decoder receiving broadcasting which uses picture compression technology, such as MPEG (Moving Picture Experts Group), and converting the data into raster data inputted to a CRT (Cathode Ray Tube) to display pictures on the CRT.

2. Description of the Background Art

Industries and countries have been using different frequencies for video signals so far. For example, the cinema industry has been mainly using a frame frequency of 24 Hz with projectors and the television industry has been using different frame frequencies (60 Hz, 59.94 Hz, 50 Hz) to display television pictures in various countries. While the picture compression technology such as MPEG is increasingly applied to broadcastings nowadays, the standards for the picture compression of MPEG relate to transmission carried on packet data, which do not uniquely define picture formats such as the frequency of transmission data, the frame size, the scanning line system, etc. because of the above-mentioned historical background.

For instance, ATV (Advanced Television) provides picture sources having various standards as shown in Table 1. The standards shown in Table 1 provide various kinds of combinations of the picture rate, the number of picture elements in the horizontal direction, the number of lines in the vertical direction, and the scanning system.

TABLE 1

| picture rate (Hz) | frame size | scanning system |
|---|---|---|
| 60.00 | 1920 × 1080 | interlace |
| 59.94 | 1920 × 1080 | progressive |
| 30.00 | 1280 × 720 | progressive |
| 29.97 | 640 × 480 | progressive |
| 24.00 | 704 × 480 | progressive |
| 23.96 | 640 × 480 | interlace |
|  | 704 × 480 | interlace |

The receiver in the ATV system must support all of the formats shown in Table 1. However, when a picture is displayed on the CRT of television by using such a low frame frequency as is used by a projector, a visual sensation called flicker is usually produced and the displayed picture is deteriorated.

Accordingly, it is necessary to convert the picture rate to a higher frame frequency at output to the CRT. FIG. 14 shows the concept of the relation between the decoder and the CRT. As shown in FIG. 14, the decoder 100 converts packet data 102 inputted to the decoder 100 into raster data 103 and outputs it to the CRT 101. The raster data 103 has a data format related to the scanning lines in the CRT 101.

Suppose that the picture rate of the video signal sent on the packet data 102 is 24 Hz and the frame frequency for display in the screen is 60 Hz. While the packet data 102 is sent to the decoder 100 at the rate of 24 pictures per second, the raster data 103 is outputted from the decoder 100 at the rate of 60 frames per second. Then the decoder 100 has to generate the raster data 103 while adjusting the difference between the number of input pictures and the number of output frames.

FIG. 15 provides a timing chart showing the relation between the packet data having the picture rate of 24 Hz and a processing time of 30 Hz and the raster data having the frame frequency of 60 Hz. It is assumed that the interlaced scanning is used.

At time t0, the packet data 110 related to a picture A arrives at the decoder 100. Generally, the packet data includes data about the picture format of the picture A in its header. Hence, the decoder 100 can generate the raster data from the received packet data 110 according to the picture format. At time t1, although the packet data 110 about the picture A has not been completely processed, the operation of outputting the raster data 111 on the even scanning line side of the picture A, or in the top field, is started because the necessary information has already been processed. At time t2, the processing of the packet data 110 is finished and the operation of outputting the raster data 112 on the odd scanning line side in the picture A, or in the bottom field, is started. Between time t2 and t3, the processing of the packet data 113 about a picture B is started. At time t3, the operation of outputting the raster data 114 on the even scanning line side in the picture A is started. The raster data 115 and 116 corresponding to the packet data 113 are read between time t4 and t6.

FIG. 15 shows the packet data 110, 113, and so on having a large amount of data which are adapted to HDTV (High Definition Television). Since the data are adapted to HDTV, they require a relatively long time for processing, e.g., 1/30 of a second. In contrast, in the case of packet data for common television with a smaller amount of data, 1/60 second, for example, is sufficient to process the data.

Generally, the decoder is required to conduct the above-mentioned conversion. When the decoder handles packet data and raster data each limited to one type, the standards such as the picture rate and the amount of data of the packet data and the frame frequency, the frame size and the scanning system of the raster data are uniquely determined. Accordingly, a simple structure can be used as the decoder even if it is used to receive broadcasting requiring synchronous processing.

However, the ATV standard requires processing of data of so many kinds of formats that the circuit structure becomes complicated when circuits adapted to the large number of kinds are separately produced and combined.

FIG. 16 is a timing chart showing, in time, the approximate amounts of data of the individual video formats after MPEG decoding, or the amounts of data (time required for processing), and the differences among processing timings of the packet data with different picture rates in the decoder. Table 2 shows the amounts of data and the picture rates of the data sequences 120–127 in FIG. 16. The processing cycles of the data sequences 124 and 127 are for the picture rate of 24 Hz, which provide an alternate cycle of 30 Hz and 20 Hz in which the timing is shifted in even and odd places in the order of processing. As shown in Table 2, the picture format can be classified into eight kinds on the basis of the combinations of the amount of data and the picture rate (processing cycle).

TABLE 2

| data sequence | amount of data (sec.) | picture rate (Hz) |
|---|---|---|
| 120 | 1/60 | 60 |
| 121 | 1/120 | 60 |
| 122 | 1/60 | 30 |
| 123 | 1/60 | 24 |
| 124 | 1/60 | 30/20 |

TABLE 2-continued

| data sequence | amount of data (sec.) | picture rate (Hz) |
|---|---|---|
| 125 | 1/30 | 30 |
| 126 | 1/30 | 24 |
| 127 | 1/30 | 30/20 |

When decoding compressed data into macro-block data, a higher processing capability is required than when handling un-compressed data. If the decoder does not have enough processing capability, correct video signals may not be generated due to lack of information necessary for decoding. If a display is made in the CRT with incorrect signals, the disordered display on the CRT will cause the viewer to mistake it for a trouble of the receiver, or the CRT may actually be broken. Hence, the configuration must be made to continuously output correct video signals.

Furthermore, if the supply of the packet data to the decoder is interrupted, the receive timing of newly supplied packet data including information about a new picture does not always coincide with the receive timing of the data before interruption.

FIG. 17 provides a timing chart showing the relation between the packet data received at the decoder and the raster data correspondingly outputted. It is assumed that the decoder 100 shown in FIG. 14, for example, receives the packet data 130–133 in a normal state. However, the packet data 131–133 may not be received for some reason, e.g., a lack of processing capability of the decoder, interruption of the broadcasting, too weak wave, a change of channel, etc. Then the decoder 100 must continuously output the raster data 138–142, in addition to the raster data 135–137 normally generated on the basis of the packet data 130. Otherwise the picture will be disturbed or become black, which is not suitable as a civil requirement television monitor.

The packet data 134 which comes first after the operation is restarted may be received at a shifted timing. In order to process the data at the same timing as the packet data 130, the data must be received at the timing of the packet data 133 shown by the dotted line. Accordingly, it is necessary when the packet data 134 is received to re-establish the synchronization of the operating timing in the decoder 100 and the synchronizing signal of the CRT 101.

SUMMARY OF THE INVENTION

A first aspect of the present invention is directed to a decoder for converting packet data including data about a picture-compressed video signal and data about a picture format into raster data. According to the present invention, the decoder comprises: first processing means for converting data about a picture-compressed video signal into intermediate data from which picture compression is eliminated and outputting the intermediate data; second processing means receiving the intermediate data and data about a picture format outputted from the first processing means, for processing the intermediate data to output raster data for one frame at a frequency equal to a frame frequency; and storage means for storing the intermediate data for a processing of the intermediate data in the second processing means; wherein the second processing means writes the intermediate data into the storage means at a frequency related to a picture rate and reads raster data for one frame from the storage means at the frequency equal to the frame frequency.

Preferably, according to a second aspect, in the decoder of the first aspect, the first processing means outputs the intermediate data for one frame and the data about the picture format as a mass of data to the second processing means.

Preferably, according to a third aspect, in the decoder of the first aspect, the storage means comprises a plurality of video signal memories each capable of writing the intermediate data for one frame, wherein the intermediate data of different frames are stored into different ones of the video signal memories, and a write target video signal memory and a read target video signal memory are switched after a termination of processing of writing new intermediate data is confirmed.

Preferably, according to a fourth aspect, the decoder of the third aspect further comprises write termination detecting means for counting a number of data in the intermediate data written into the storage means and comparing an expected value of a number of data to be written which is obtained from the data about the picture format and a counted number of data to detect a termination of the writing of the intermediate data into the storage means, wherein a write target video signal memory and a read target video signal memory are switched in response to a detection of a termination of writing by the write termination detecting means.

Preferably, according to a fifth aspect, in the decoder of the fourth aspect, the storage means further comprises a plurality of property holding memories each provided corresponding to each of the plurality of video signal memories, for storing data about a picture format related to the intermediate data written into a corresponding video signal memory.

Preferably, according to a sixth aspect, the decoder of the fifth aspect further comprises format change detecting means for comparing data about picture formats stored in the plurality of property holding memories to detect a format change in which successively transferred two pictures are treated as different sequences.

Preferably, according to a seventh aspect, the decoder of the sixth aspect further comprises first and second registers for holding field information indicating whether the intermediate data to be displayed corresponds to the top field or the bottom field, comparison means for comparing field information stored in the first and second registers, and field information detecting means for detecting that the field information is included in data about a picture format, wherein with the intermediate data newly written into the storage means, when the format change detecting means detects a format change or when the field information detecting means detects inclusion of the field information, the field information stored in the second register is shifted to the first register in response to a detection of a termination of writing by the write termination detecting means, and the field information obtained from data about the picture format related to the intermediate data newly written is stored into the second register.

Preferably, according to an eighth aspect, the decoder of the fourth aspect further comprises read detection counting means for counting a number of times the same intermediate data is read from the storage means, read number expected value detecting means for detecting an expected value of a number of times the intermediate data should be read in normal operation by using the data about the picture format corresponding to the intermediate data, and comparison means for comparing the expected value of the number of times that the intermediate data should be read which is detected by the read number expected value detecting means and an output of the read detection counting means.

According to the decoder of the first aspect, when repeatedly reading the intermediate data for one frame, it is not necessary to count how many times the data is read in order to change the read number as required. Accordingly, the circuit configuration can be simplified.

According to the decoder of the second aspect, the intermediate data and the corresponding data about the picture format sequentially transferred to the second processing means can be received by using the same signal line. This provides the effect of reducing the number of signal lines required for data transmission between the first and second processing means. Even if the transmission interval of the intermediate data changes, the intermediate data and the corresponding data about the picture format can be transferred together, which provides the effect of eliminating the necessity of adjusting the transmission timing of the intermediate data and the data about the picture format.

According to the decoder of the third aspect, when a certain video signal memory is a target of the write processing, the reading processing can be applied to another video signal memory. Accordingly, when the write frequency and the read frequency differ, the intermediate data for one field stored in one video signal memory can be repeatedly read with ease in scanning.

According to the decoder of the fourth aspect, a termination of the writing processing is detected by the write termination detecting means which detects the termination of writing according to the number of written data. Accordingly, a write target video signal memory and a read target video signal memory can be certainly and easily switched.

According to the decoder of the fifth aspect, when data is repeatedly read from a certain video signal memory, the data about the picture format of the video signal stored in that video signal memory can readily be obtained from the property holding memory to output a still picture.

According to the decoder of the sixth aspect, the format change detecting means can detect a change of the format. Accordingly, when displaying pictures of different picture formats, the system including the CRT can be initialized when the read target video signal memory is switched, for example.

According to the decoder of the seventh aspect, when a field for scanning the same odd or even scanning lines continues in the first and second registers, the decoder can detect it. It can deal with the case in which the picture format changes and the case in which only the field information changes, in order to direct the correction so that the field for scanning the odd scanning lines and the field for scanning the even scanning lines can be alternately displayed.

According to the decoder of the eighth aspect, a shift in timing for writing and reading can be detected when no broadcasting is sent after the end of broadcasting and when the channel is changed. Accordingly, a decoder which initializes the system including the decoder when a timing shift occurs in writing and reading can be realized with a simple circuit structure.

The present invention has been made to solve the problems mentioned above. An object of the present invention is to provide a decoder which can deal with a large number of picture formats with a simple circuit structure. Another object is to provide the decoder with a function of outputting a still picture when data cannot be decoded so that a correct picture can be displayed for some reason to prevent the picture from being disturbed. A further object of the invention is to provide the decoder with a function of initializing the CRT and the decoder when a still picture is outputted to re-establish synchronization in the data about the video signal and the synchronization signals of the CRT.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a circuit diagram showing an example of the structure of the format change detecting circuit.

DESCRIPTION OF THE PREFERRED EMBODIMENTS

Figure 1:
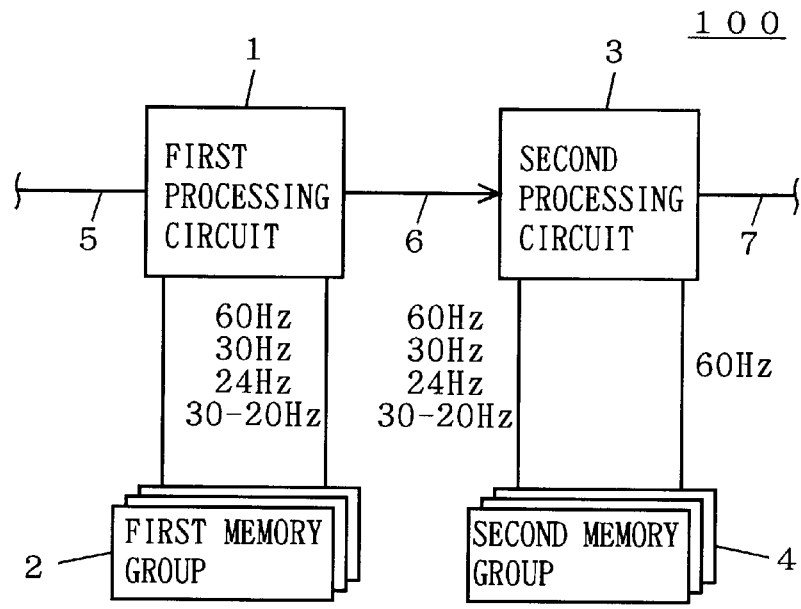
FIG. 1 is a block diagram showing an example of the structure of a decoder of the invention.
Figure 14:
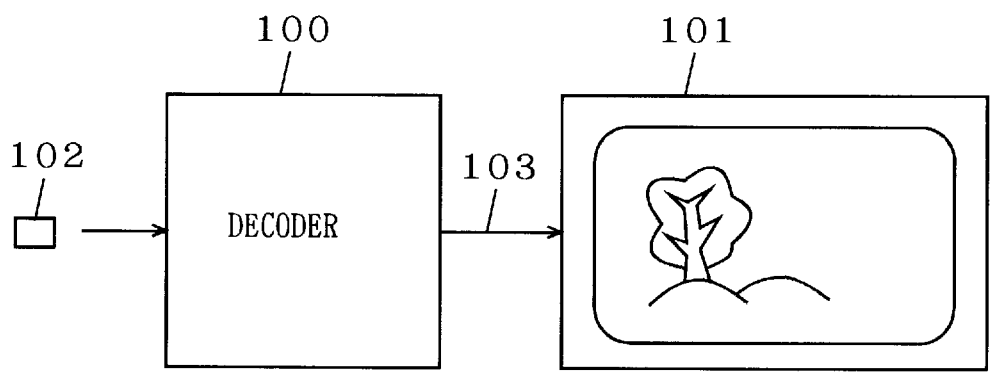
FIG. 14 is a conceptual diagram showing the relation between the decoder and the CRT.
Figure 15:
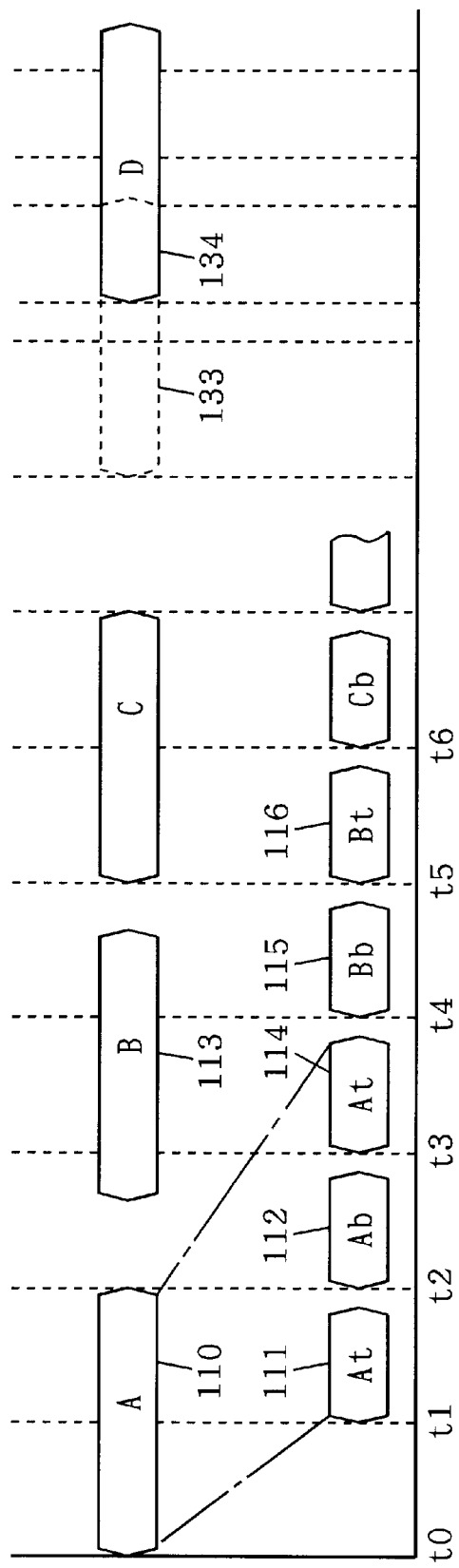
FIG. 15 is a timing chart showing the relation between the packet data and the raster data inputted to or outputted from the decoder.
Figure 16:
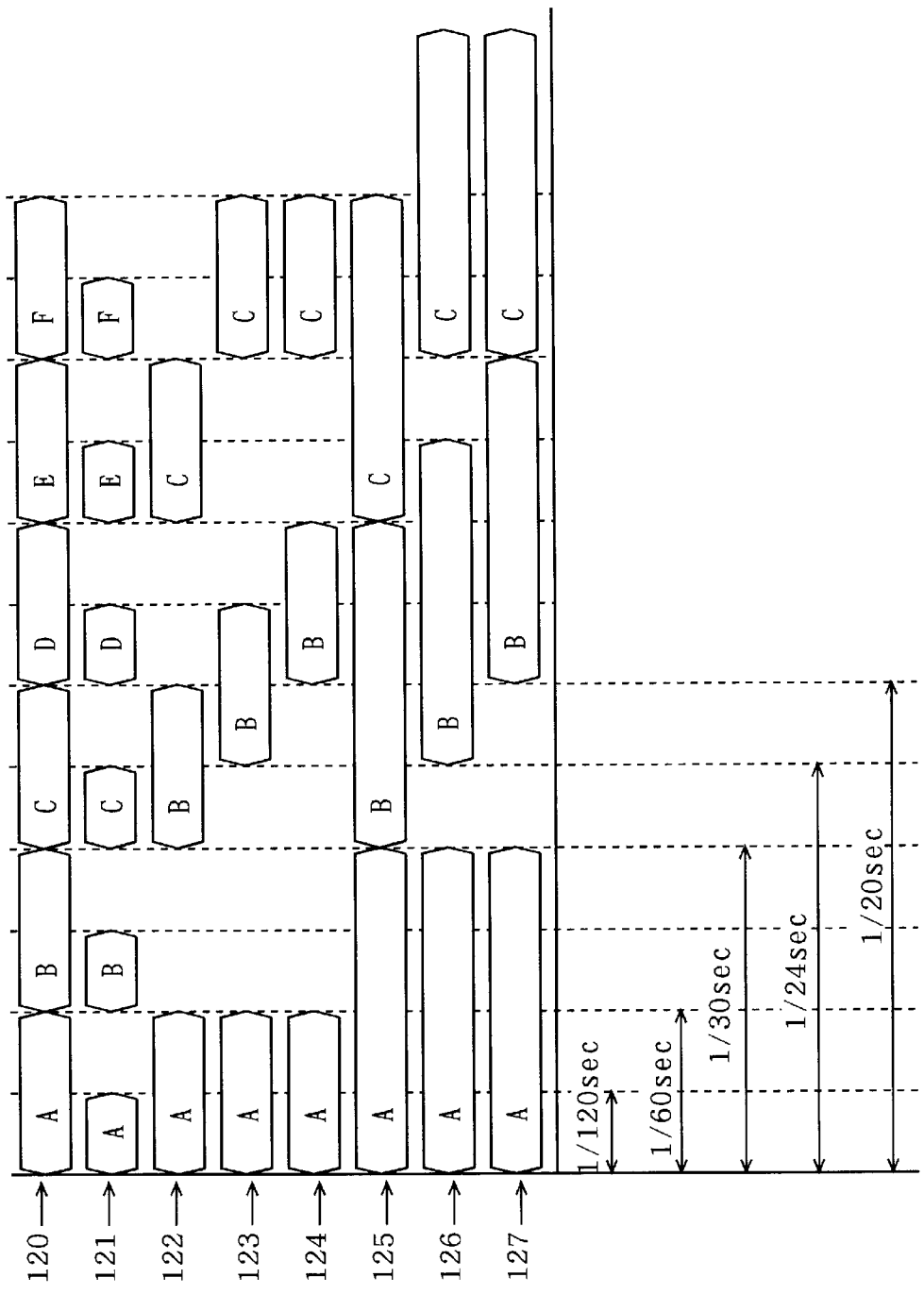
FIG. 16 is a timing chart showing the picture formats of various kinds classified on the basis of the amount of data and the processing cycle.
Figure 17:
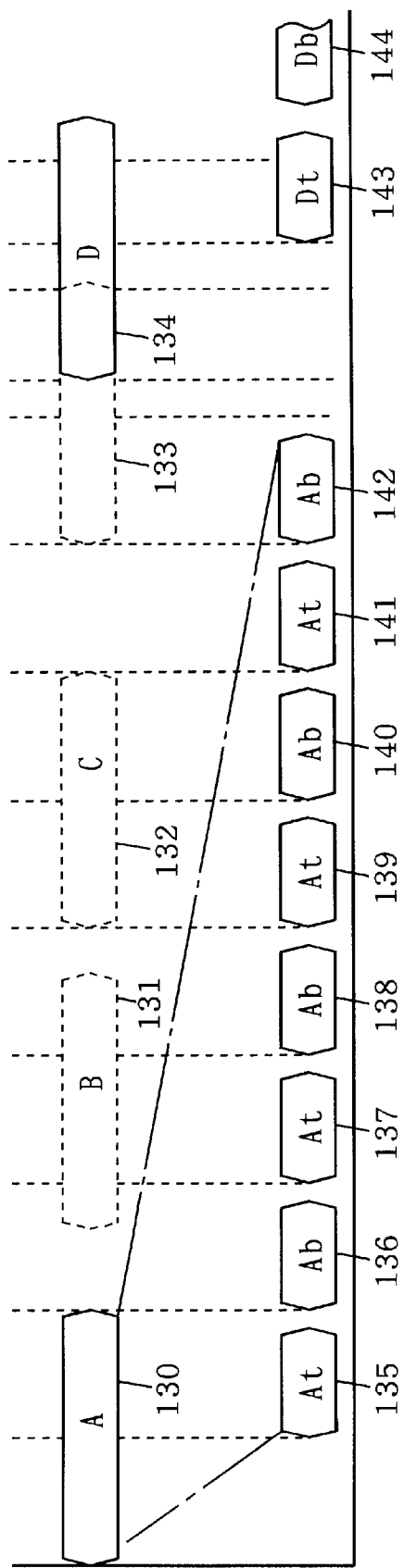
FIG. 17 is a timing chart showing abnormal reception of the decoder.

Now a preferred embodiment of a decoder according to the present invention will be described referring to the drawings. FIG. 1 is a block diagram showing the internal structure of a decoder of the invention. FIG. 1 shows the inside of the decoder 100 shown in FIG. 14. This decoder 100 decodes MPEG packet data 102 into raster data 103. First, the packet data 102 carried on a bus 5 is converted into macro-block data in a first processing circuit 1. The first processing circuit 1 generates macro-block data having a 16×16 pixel square structure, for example, by using inverse quantization, inverse DCT (Discrete Cosine Transform), and change order. The change order means the operation of changing the order of frames to remove the picture compression. In order to store the packet data 102 and data used in the process when conducting such conversions, the first processing circuit 1 has a first memory group 2 which is capable of writing at arbitrary frequency depending on the broadcasting frequency and reading with cycles of 60 Hz, 30 Hz, 24 Hz and the alternate cycle of 30 and 20 Hz.

The macro-block data is transferred from the first processing circuit 1 to a second processing circuit 3 through a bus 6. The macro-block data is converted into the raster data 103 in the second processing circuit 3 and the second memory group 4. The second processing circuit 3 writes the macro-block data into the second memory group 4 according to the picture rate of the macro-block data and reads the raster data 103 from the second memory group 4 according to the frame frequency, e.g., 60 Hz in this example, and outputs the data. It converts the macro-block data into the raster data 103 by reading the raster data from the second memory group 4 in an order different from the writing order. The converted raster data 103 is transferred to the CRT 101 through a signal line 7.

The picture rate of the macro-block data includes 60 Hz, 30 Hz, 24 Hz, and the alternate cycle of 30 and 20 Hz and the data is provided to the second processing circuit 3 according to the picture rate. However, it is not fixed at which rate the data is provided.

Accordingly, the first processing circuit 1 outputs the macro-block data according to the picture rate and the second processing circuit 3 writes the macro-block data into the second memory group 4 according to the output cycle of the macro-block data. The second processing circuit 3 determines the difference between the frame frequency and the picture rate on the basis of the information about the picture rate (the information includes the information indicating that the output frequency corresponds to the picture rate) to determine how many times and at what timing the raster data 103 should be read from the second memory group 4.

Since the information about the picture format such as the picture rate is incorporated together with the macro-block data into the transmission data transmitted on the same bus, it is possible to reduce the number of signal lines in the bus 6 used to exchange data between the first processing circuit 1 and the second processing circuit 3.

Here, the macro-block data is read from the second memory group 4 at 60 Hz. Accordingly, when the macro-block data is written at 30 Hz, for example, data about the same video signal can be read twice. Since the data is written into the second memory group 4 at the picture rate described in the packet data 102, a required number of accesses can be made to data about the same video signal without the necessity of counting the number of times that the data is read.

Figure 2:
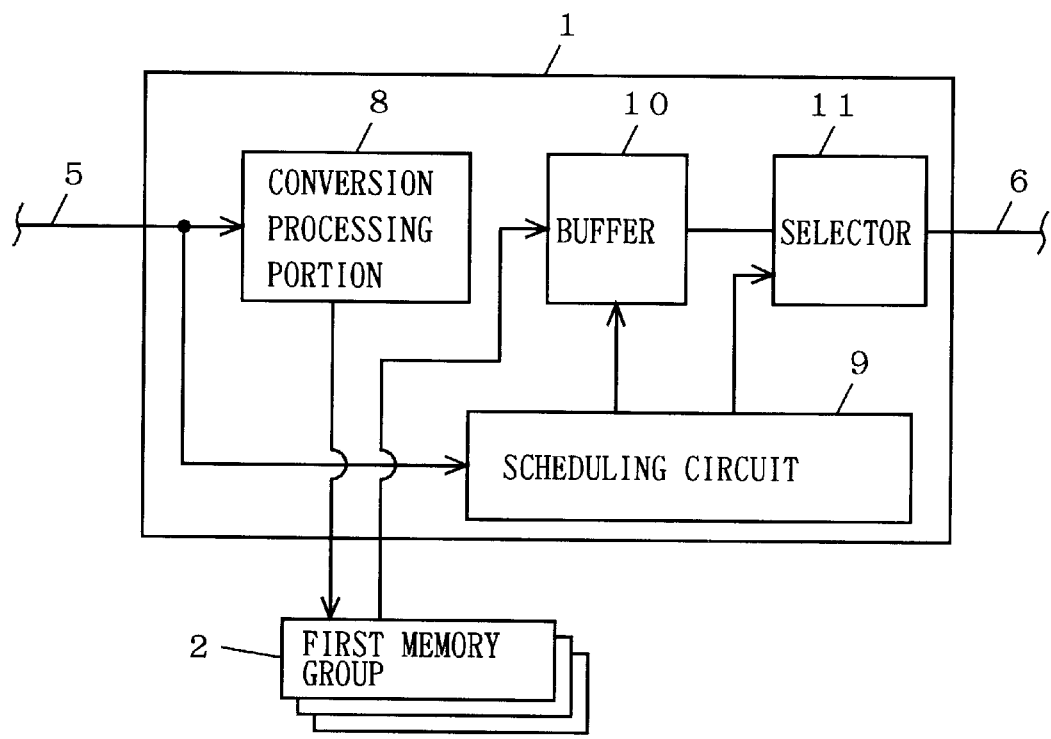
FIG. 2 is a block diagram illustrating the structure of the first processing circuit shown in FIG. 1.

FIG. 2 is a block diagram showing the structure of the first processing circuit 1. In FIG. 2, a conversion processing portion 8 applies inverse quantization, inverse DCT and the change order to the packet data 102 to generate the part related to the macro-block data. The packet data 102 is also inputted to the scheduling circuit 9. The scheduling circuit 9 extracts the data about the picture format, such as the picture rate, the scanning system, the frame size, the amount of data, etc. from the header of the packet data 102 to generate the head of the transmission data. The macro-block data outputted from the conversion processing portion 8 is stored into a buffer 10 through the first memory group 2. Then a selector 11 first changes the connection to output the head of the transmission data outputted from the scheduling circuit 9 and then changes the connection to output the part related to the macro-block data from the buffer 10. When the selector 11 changes the connection in this way, the first processing circuit 1 can add the data about the picture format necessary to display the picture to the head of the transmission data. The transmission data includes macro-block data for one frame.

TABLE 3

| | | | | | | FRAME NAME | | | | | | |
|---|---|---|---|---|---|---|---|---|---|---|---|---|
| | | | | | 640 × 480 | fr1 | fr2 | fr3 | fr4 | fr5 | fr6 | fr7 |
| | | | | | 704 × 480 | fr8 | fr9 | fr10 | fr11 | fr12 | fr13 | fr14 |
| | | | | | 1920 × 1080 | NA | fr15 | fr16 | fr17 | fr19 | fr20 | fr21 |
| PROGRES- | PROGRES- | | | | 1280 × 720 | | | | | | | |
| SIVE | SIVE | | | | FRC | 7,8 | 4,5 | 4,5 | 4,5 | 4,5 | 4,5 | 1,2 |
| SEQUENCE | FRAME | PSTR | RFF | TFF | DISPLAY ORDER | 60 | 30 | 30 | 30 | 30 | 30 | 24 |
| 0 | 0 | 1 | 0 | 0 | TOP | | | | | | a | |
| | | 2 | | | BOTTOM | | | | | | b | |
| | | 3 | | | BOTTOM-TOP | | bc | | | | | |
| | | | | 1 | TOP-BOTTOM | | ab | | | | | |
| | 1 | | | 0 | BOTTOM-TOP | | | AoAe | DoDe | | | |
| | | | | 1 | TOP-BOTTOM | | | AoAe | DoDe | | | |
| | | | 1 | 0 | BOTTOM-TOP-BOTTOM | | | | CoCeCo | | | (AoAeAoBeBo) |
| | | | | 1 | TOP-BOTTOM-TOP | | | | AoAeAo | | | (AeAoAeBoBe) |
| 1 | | | 0 | 0 | X | AoBe | | | | | AoAe | ← |
| | | | 1 | 0 | XX (TWICE) | | | | | | | |
| | | | | 1 | XXX (THREE TIMES) | | | | | | | |

TABLE 4

640 × 480
704 × 480

|  |  |  |  |  | 1920 × 1080 | FRAME NAME | | | | |
|---|---|---|---|---|---|---|---|---|---|---|
| PROGRESSIVE SEQUENCE | PROGRESSIVE FRAME | PSTR | RFF | TFF | 1280 × 720 FRC DISPLAY ORDER | fr22 7,8 60 | fr23 7,8 60 | fr24 7,8 60 | fr25 4,5 30 | fr26 1,2 24 |
| 0 | 0 | 1 | 0 | 0 | TOP | | | | | |
|  |  | 2 |  |  | BOTTOM | | | | | |
|  |  | 3 |  |  | BOTTOM-TOP | | | | | |
|  |  |  |  | 1 | TOP-BOTTOM | | | | | |
|  | 1 |  |  | 0 | BOTTOM-TOP | | | | | |
|  |  |  |  | 1 | TOP-BOTTOM | | | | | |
|  |  |  | 1 | 0 | BOTTOM-TOP-BOTTOM | | | | | (AAABB) ↓ |
|  |  |  |  | 1 | TOP-BOTTOM-TOP | | | | | |
| 1 |  |  | 0 | 0 | X | A | | | AA | |
|  |  |  |  | 1 | XX (TWICE) | | AA | AA | | |
|  |  |  |  | 1 | XXX (THREE TIMES) | | | BBB | | |

As shown in Table 3, data about the progressive sequence (hereinafter referred to as PSEQ), the progressive frame (PFRM), the picture field (PSTR), the repeat first field (RFF), the top field first (TFF), the frame rate code (FRC) and the data about the frame size (HSV, VSV), etc. are intactly extracted in the scheduling circuit 9 from the data included in the MPEG2 packet and added to the macro-block data. HSV (Horizontal Size Value) indicates the number of picture elements in the horizontal direction and VSV (Vertical Size Value) indicates the number of scanning lines in the vertical direction.

For example, when the data about PSEQ, PFRM, PSTR, RFF, TFF, FRC are (0, 0, 3, 0, 0, 4 or 5), it can be recognized that the bottom (the even scanning lines) is scanned in the first read picture b in the picture for one frame written at 30 Hz into the second memory group 4 and the top (the odd scanning lines) is scanned in the second read picture c, and that it corresponds to one of the frame names fr2, fr9, fr15.

In Table 3 and Table 4, the small letters a–c indicate interlace and the capital letters A–C indicate progressive. The subscripts o and e indicate the odd scanning lines and the even scanning lines, respectively.

When the data about PSEQ, PFRM, PSTR, RFF, TFF, FRC are (1, 1, 3, 0, 0, 4 or 5), it means that it corresponds to the 30 Hz progressive picture and one of the frame names fr6, fr13, fr20. The character (Ao, Ae) at the intersections of the vertical and horizontal lines in Table 3 and Table 4 indicates that the MPEG packet specifies that the video signal of the picture A written into the second memory group 4 at 30 Hz should be scanned separately in the odd scanning lines and the even scanning lines and read at 60 Hz.

Figure 3:
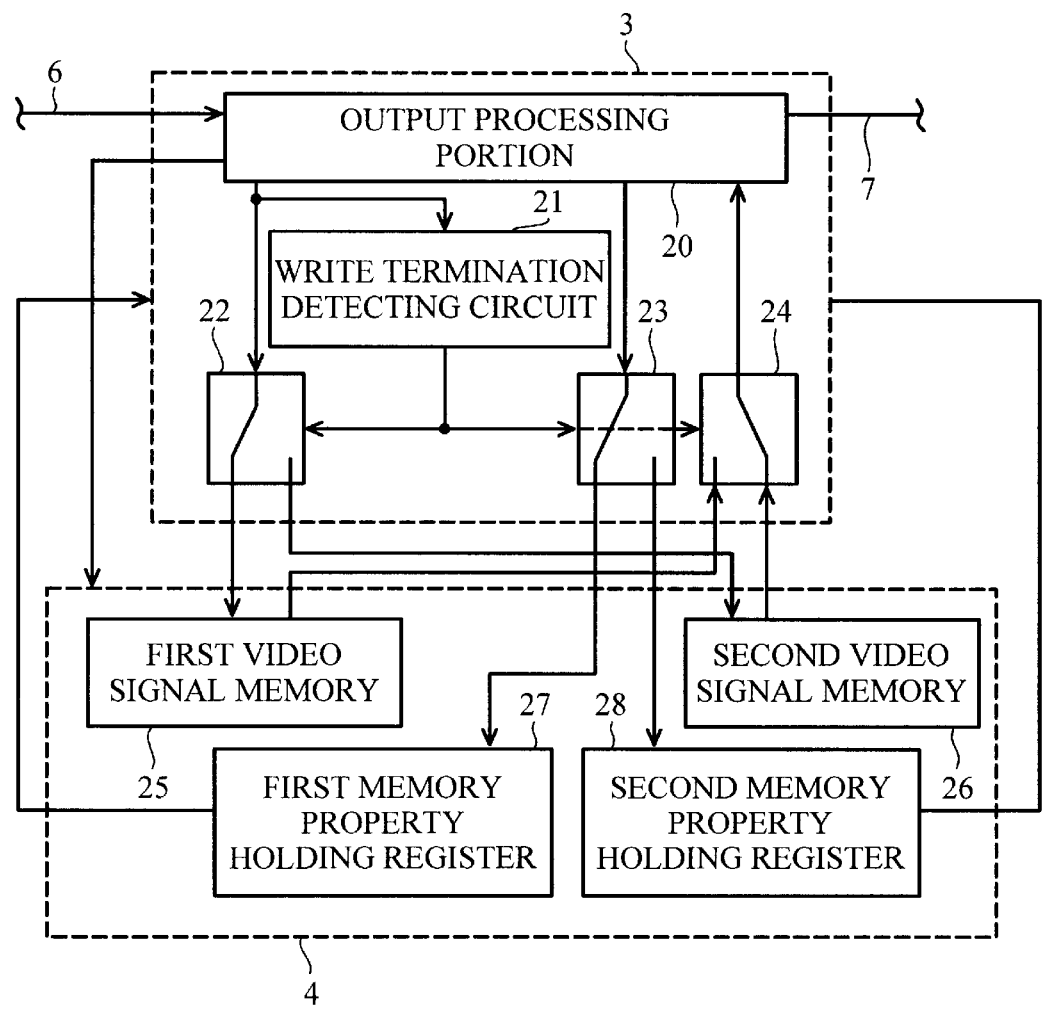
FIG. 3 is a block diagram illustrating a structure of the second processing circuit shown in FIG. 1.
Figure 4:
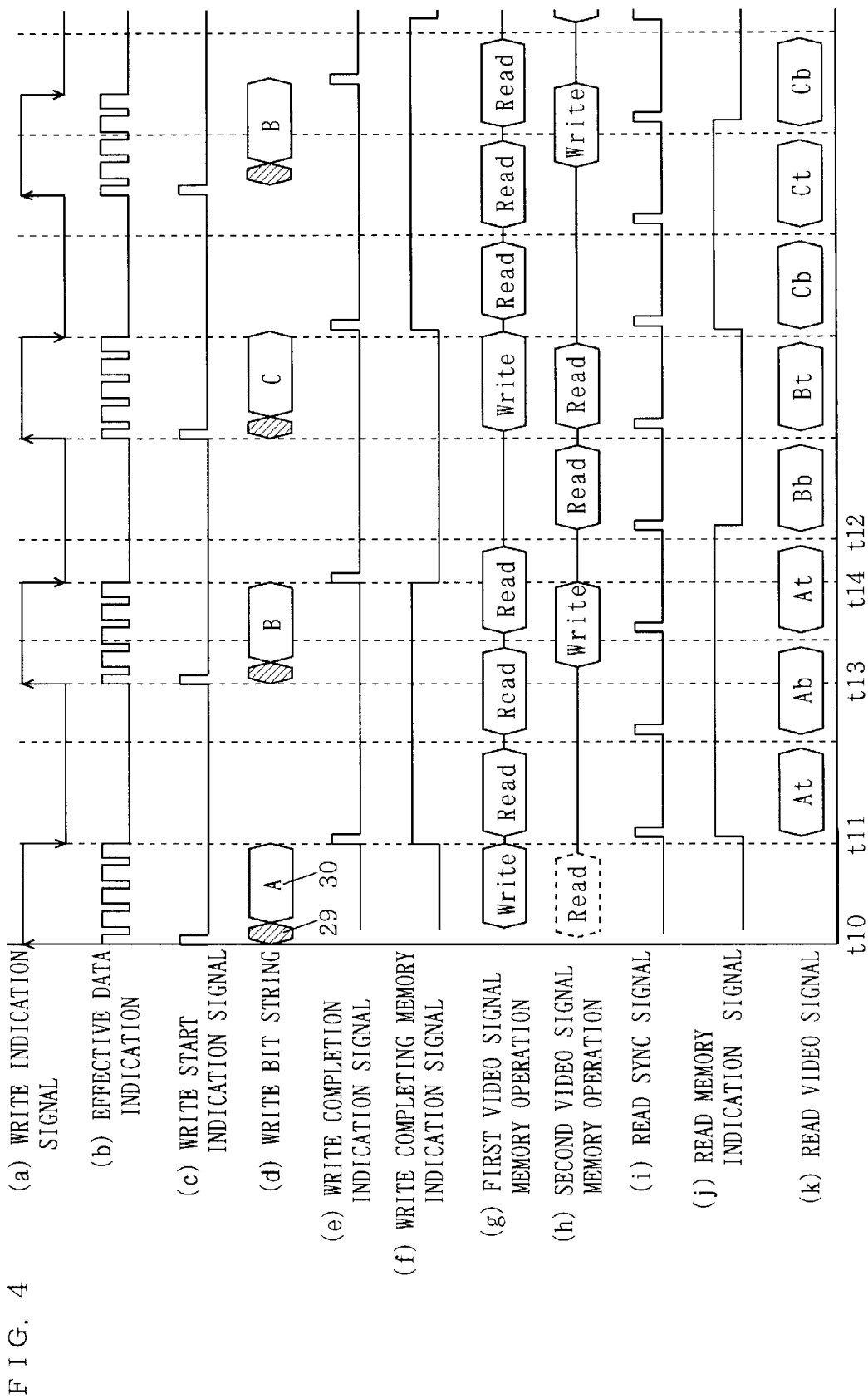
FIG. 4 is a block diagram showing an example of operation of the decoder shown in FIG. 1 and FIG. 3.

Next, the second processing circuit 3 receiving the above-described macro-block data for generating the raster data will be explained referring to FIG. 3 and FIG. 4. FIG. 3 is a block diagram showing a structure of the second processing circuit and FIG. 4 is a timing chart showing an example of operation of the second processing circuit. An output processing portion 20 in FIG. 3 receives the transmission data, a write indication signal and an effective data indication signal from the first processing circuit 1 shown in FIG. 1 through the bus 6. The write indication signal shown in FIG. 4(a) directs the second processing circuit 3 to start writing the macro-block data at the rising timing of the signal. The output processing portion 20 generates a write start indication signal as shown in FIG. 4(c) to direct write operation of the macro-block data. The effective data indication signal shown in FIG. 4(b) indicates the periods in which the transmission data from the first processing circuit 1 is to be recognized as effective data. When the effective data indication signal is at a high level, the output processing portion 20 recognizes the value of the signal received through the bus 6 as the transmission data. In the write bit string shown in FIG. 4(d), the shaded portion shown at the numeral 29 corresponds to the head and the portion shown at the numeral 30 corresponds to the portion including the macro-block data.

The output processing portion 20 removes the head from the transmission data and outputs the macro-block part to a write termination detecting circuit 21 and a first selecting circuit 22. The data included in the head of the transmission data is outputted to a second selecting means 23.

The write termination detecting circuit 21 counts the number of data of the macro-block data to be written. The write termination detecting circuit 21 obtains information about the picture format related to the written video signal from the output processing portion 20 or first or second memory property holding register 27, 28. That is to say, the write termination detecting circuit 21 is provided with the number of data to be written from the output processing portion 20, and the output processing portion 20 obtains an expected value of the number of data to be written to form a piece of picture from the data about the picture format, such as the frame size, the scanning line system, and the like.

FIG. 4 shows the operation of the second processing circuit 3 performed when transmission data with a write interval of 60 Hz and a write cycle of 24 Hz is received. At time t10, the first selecting means 22 under the control of the write termination detecting circuit 21 is selecting a first video signal memory 25. When the write start indication signal is outputted, the data about the picture A is written into the first video signal memory 25, as shown in FIG. 4(g). At the same time, information required to display the picture in the data about the picture format of the video signal written into the first video signal memory 25 is stored into the first memory property holding register 27 selected by the second selecting circuit 23.

The third selecting circuit 24, under the control by the write termination detecting circuit 21, is reading the data about the picture preceding the picture A from the second video signal memory 26, as shown in FIG. 4(h). The required data about the picture format related to the video signal is stored in the second memory property holding register 28.

At time t11, as the number of data written into the first video signal memory 25 reaches the expected value, the write termination detecting circuit 21 detects the termination of the processing of writing the macro-block data. Then the write termination detecting circuit 21 changes the write completing memory indication signal shown in FIG. 4(f) to switch the connections of the first to third selecting circuits 22–24. With this switch, after time t11, data is read from the first video signal memory 25 and data is written into the second video signal memory 26 and the second memory property holding register 28.

Between time t11 and t12, that is to say, in 1/20 of a second, the data about the same video signal is read three times from the first video signal memory 25 in response to the read synchronizing signal shown in FIG. 4(i). Since the data about the picture format related to the data of the read video signal is stored in the first memory property holding register 27, it is possible to read the data a plurality of times.

At time t13, when the write indication signal changes to the high level, the operation of writing the data of the picture B into the second memory property holding register 28 and the second video signal memory 26 is started. At time t14, when the write termination detecting circuit 21 detects the termination of writing, the write completion indication signal is generated in the second processing circuit 3. This write completion indication signal toggles the write completing memory indication signal and the first and second selecting circuits 22 and 23 are switched. However, the read memory indication signal shown in FIG. 4(j) is merely placed into a state capable of toggle, and its value changes when the value of the write completing memory indication signal is latched at the timing of next output of the read synchronizing signal. Accordingly, the target of reading is not changed from the first video signal memory 25 to the second video signal memory 26 at time t14 at which the first video signal memory 25 is in the read operation.

The write operations into the first video signal memory 25 and the second video signal memory 26 are switched when the write operations into the first and second video signal memories 25 and 26 have been terminated. Accordingly, whatever picture format the write bit string corresponds to, the data can be written appropriately. As can be seen from the read video signal shown in FIG. 4(k), the data about the video signal related to the picture A is read three times, the data related to the video signal for the picture B is read twice, and the data related to the video signal about the picture C is read three times. This way, whatever picture format the write bit string corresponds to, the data is written into the first or second video signal memory 25 or 26 in step with the write timing, and it is therefore possible to provide proper processing without identifying the write timing of the macro-block data and the read timing of the raster data in the second processing circuit 3 by using the information described in the data about the picture format.

Figure 5:
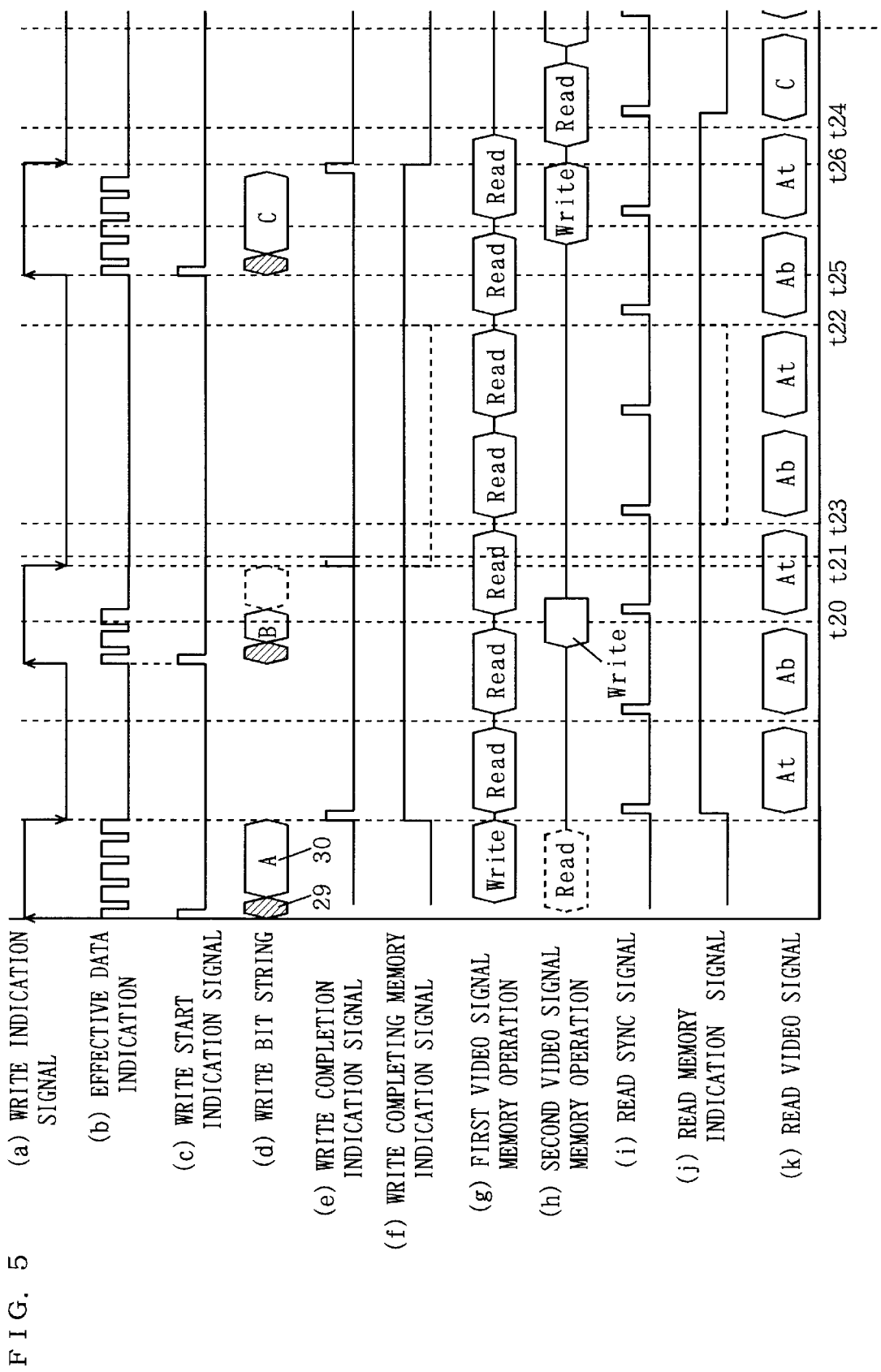
FIG. 5 is a block diagram showing another example of operation of the decoder shown in FIG. 1 and FIG. 3.

Next, suppose that data to be written into the first or second video signal memory 25, 26 was not written therein or was not written sufficiently for some reason. For example, FIG. 5 provides a timing chart in the case of a lack of the write bit string about the picture B. The signals and the operations of the first and second video signal memories shown in FIGS. 5(a)–(k) correspond to the signals shown in FIGS. 4(a)–(k), respectively. When the second processing circuit 3 normally receives the transmission data, the device should operate as shown in FIG. 4. However, the macro-block data about the picture B to be received in time t20–t21 is invalid. In this case, the write termination detecting circuit 21 does not detect the termination of writing because the number of data written into the second video signal memory 26 does not reach the expected value. Since the write termination detecting circuit 21 does not detect the termination of writing, the write completing memory indication signal, which is toggled in FIG. 4, is not changed between times t21 and t22. Accordingly, the first and second selecting circuits 22 and 23 are not switched. In time t23–t22, the read memory indication signal does not change. Then the data about the picture A is continuously read seven times from the first video signal memory 25 in total including the period t23–t24 and a still picture can thus be outputted. Since the structure just counts the number of written data, the write termination detecting circuit 21 can be shared among all picture formats, which simplifies the circuit configuration of the decoder. When effective data cannot be provided due to lack of the processing capability of the first processing circuit 1, for example, the termination of writing cannot be determined with the falling timing of the write indication signal. Accordingly, the use of the write termination detecting circuit 21 is especially effective.

When the write indication signal rises at time t25, the write operation into the second video signal memory 26 and the second memory property holding register 28 is restarted. When the write operation of the macro-block data about the picture C ends at time t26, then the termination of writing is detected in the write termination detecting circuit 21 and the write completing memory indication signal changes. Accordingly, the write operation is next applied to the first video signal memory 25 and the first memory property holding register 27.

When a still picture is outputted, the write timing of the macro-block data to be written next does not always coincide with the previous write timing. Therefore it is necessary to initialize the decoder 100 and the CRT 101. It is then necessary that the output of the still picture state is detected.

Figure 7:
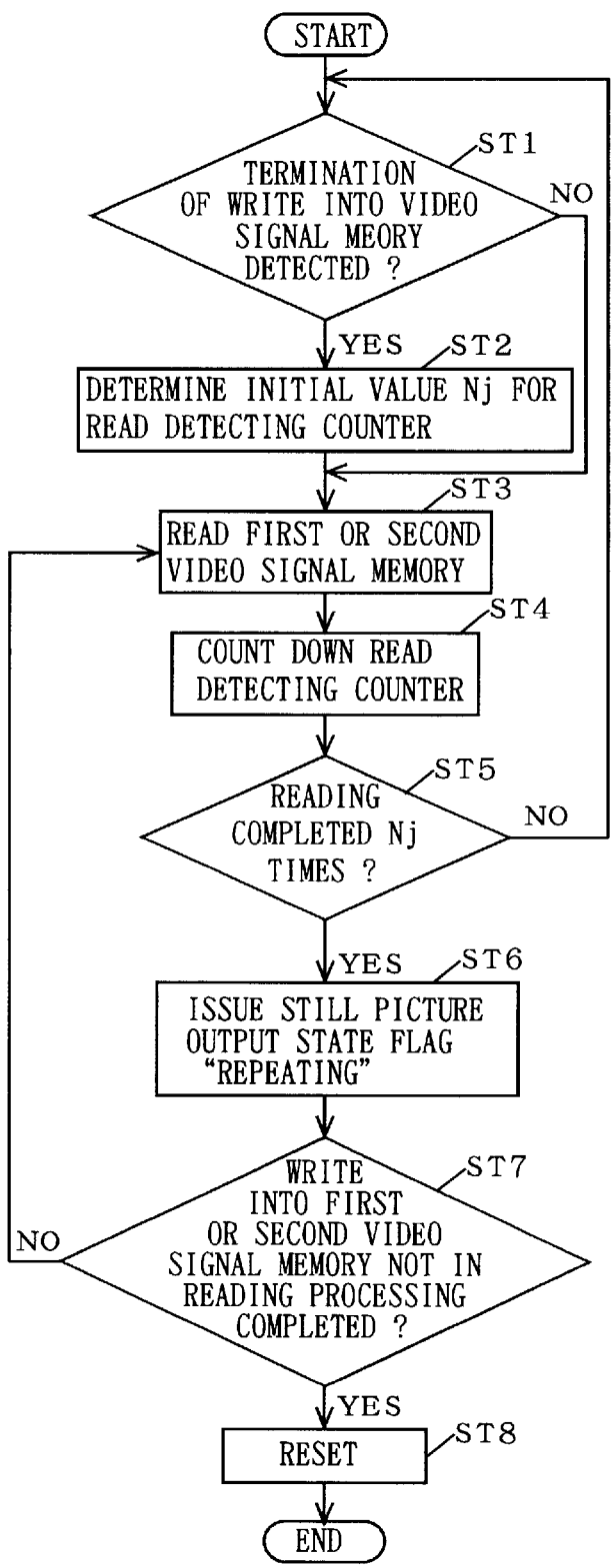
FIG. 7 is a flowchart illustrating the procedure of outputting a still picture using the second processing circuit shown in FIG. 6.
Figure 8:
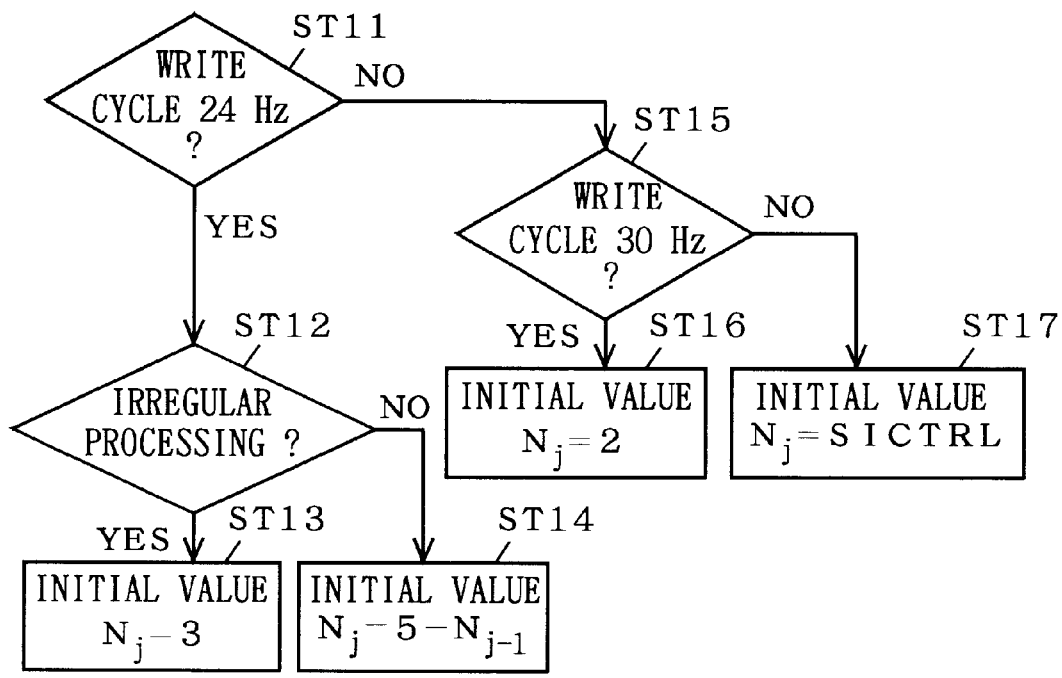
FIG. 8 is a flowchart illustrating the function of the read number expected value generating circuit.

Detection of the still picture state will be described referring to FIG. 7–FIG. 9.

Figure 6:
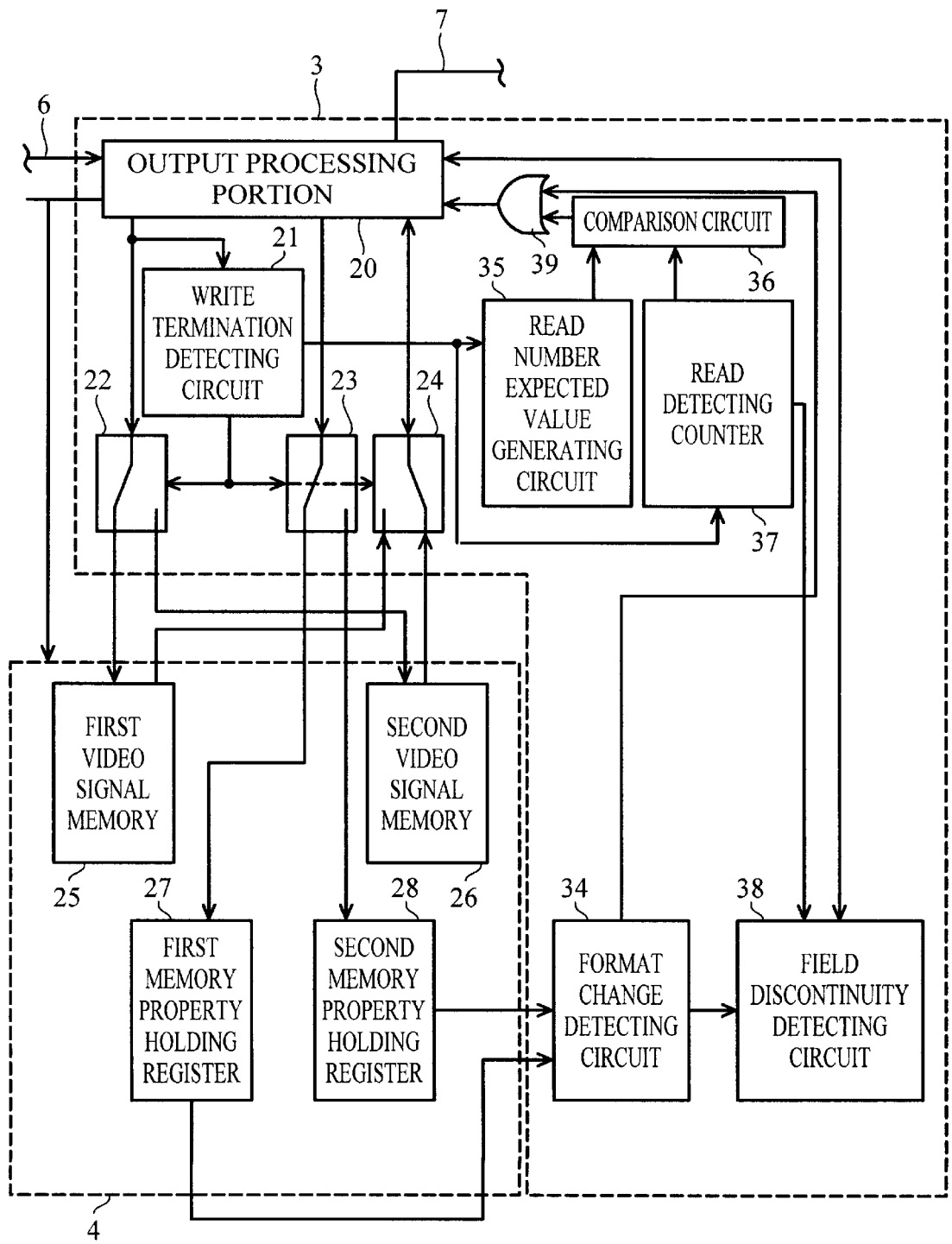
FIG. 6 is a block diagram showing another example of the structure of the second processing circuit shown in FIG. 1.

To detect the still picture state, it is necessary to add the detecting function to the second processing circuit 3 shown in FIG. 3. FIG. 6 is a block diagram showing a structure having a read number expected value generating circuit 35, a read detecting counter 37 and a comparison circuit 36 for detecting the still picture state, which further has a format change detecting circuit 34 for detecting a change of the picture format and a field discontinuity detecting circuit 38 for detecting that the top field (or the bottom field) has been successively specified. FIG. 7 is a flowchart showing the procedure of detecting the still picture output state. First, it is determined whether a termination of writing into one of the first and second video signal memories 25 and 26 has been detected (step ST1). This determination is made by seeing whether the write completing memory indication signal has been changed by the write termination detecting circuit 21. When the writing has been completed, it moves to step ST2 to determine the initial value Nj for the read detecting counter and input the initial value into the read detecting counter. The process moves to step ST3 after step ST2, or when a termination of writing is not detected in step ST1, and then data is read from the first or second video signal memory 25 or 26. Next, the procedure moves to step ST4, and when the reading processing from the first or second video signal memory 25 or 26 is ended, the read detecting counter is counted down. Next, in step ST5, it is determined whether the read operation has been finished Nj times with the read detecting counter. When the reading has not been finished Nj times, the above-mentioned procedure is repeated from step ST1. If the read operation has been completed Nj times, it moves to step ST6 to issue a flag "repeating" indicating output of a still picture. Then it moves to step ST7 to determine whether write operation to the first or second video signal memory 25 or 26 has been ended by using the write termination detecting circuit 21. When the writing has been ended, the flow moves to step ST8 to perform initialization of the CRT and the decoder. If it is determined in step ST7 that the write operation to the first or second video signal memory 25 or 26 has not been finished, the flow moves to step ST3 to continue reading to output the still picture.

The processing in step ST2 shown in FIG. 7 will be described in detail referring to FIG. 8. FIG. 8 shows the function of the read number expected value generating circuit 35. In step ST11, it is determined whether the macro-block data has a picture format with the write cycle of 24 Hz. That is to say, it is checked whether the FRC included in the macro-block data has a value of "1" or "2." If the value is "1" or "2," the process moves to step ST12 to determine whether it is in the irregular processing. If it is in the course of the irregular processing, the initial value Nj of the read detecting counter is set to 3 in step ST13. If it is not in the irregular processing, the initial value Nj of the read detecting counter is set to 5 minus the previous initial value $Nj_{-1}$ of the read detecting counter in step ST14. The irregular processing indicates the series of processes of receiving a new video input and initializing the synchronization after the format change in which the picture format is changed or after output of a still picture.

When it is determined that the FRC has a value other than "1" or "2" in step ST11, the process moves to step ST15 to determine whether the write cycle is 30 Hz or not. If the write cycle is 30 Hz, the initial value Nj is set to 2, and if the write cycle is not 30 Hz, the initial value Nj is set to SICTRL. The SICTRL means the number of times that the field is repeatedly read. As can seen from Table 3 and Table 4, it is set to the repeating number "1" if (PSEQ, PFRM, PSTR, RFF, TFF, FRC)=(1, 1, 3, 1, 1, 4 or 5).

Next, the structure of the read detecting counter 37 will be described referring to FIG. 9. In FIG. 9, the D flip-flop 40 captures a high level as data at a leading edge of the signal FP. The D flip-flop 41 captures the output of the D flip-flop 40 as data at the leading edge of the signal FP. The D flip-flop 42 captures the output from the D flip-flop 41 as data at the leading edge of the signal FP. The signal FP is a read synchronizing signal for the first or second video signal memory 25 or 26 in FIG. 3, for example, which has the same cycle as the read cycle.

If the initial value Nj is 3, the D flip-flops 40–42 are reset and data held therein are all set to a low level. When the read detecting counter is set in this way, a high level is written from the D flip-flop 40 toward the D flip-flop 42 every time the process passes step ST4, and the output of the D flip-flop 42 changes to the high level when the reading is terminated Nj times.

Figure 9:
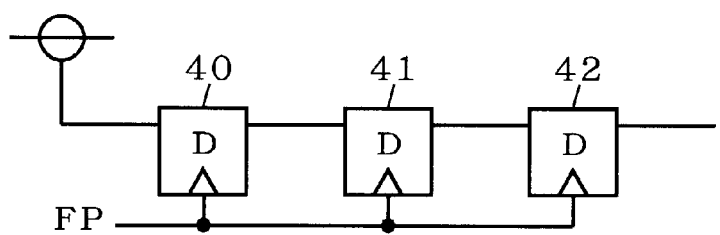
FIG. 9 is a circuit diagram showing an example of the structure of the read detecting counter.

When such a read detecting counter as shown in FIG. 9 is provided, it is possible to determine whether a still picture is outputted with the change of the output of the read detecting counter. When a still picture is outputted, the CRT and the decoder can be initialized at the timing at which the next effective picture has been written in.

The detection and processing in the case where the picture format is changed will be described referring to FIG. 6 and FIG. 7.

As possible examples of the change of the picture format, the receiving side may change the channel to a desired one among a plurality of channels, or the transmitting side may output the picture with a plurality of picture formats by using the same channel. The CRT and the decoder may have to be initialized also when the picture format is changed. However, as to the frame names fr2, fr9, fr15, fr16, fr17, it is not necessary, even if the format is changed between them, to initialize the CRT and the decoder if the field is not discontinuous. Therefore it is handled as no format change. It is then necessary to determine whether initialization should be made depending on whether the field is discontinuous, which will be described later.

The following three cases are detected as the format change. 27

When the vertical size value VSV is changed, when RFF or FRC is changed in the case of a VSV of 720, or when PSEQ, PFRM, PSTR, or FRC is changed in the case of a VSV of 1080 or 480, it is regarded as the format change. Since the values of TFF and RFF change for each transmission picture in the case of the frame names fr17 and fr24, it is impossible to determine that the picture format has been changed when any of the video information has been changed. Accordingly the determination must be made for each frame size as mentioned above. The format change detecting circuit 34 shown in FIG. 6 outputs a signal to the OR gate 39 to initialize the CRT and the decoder when the format is changed. The signal is outputted at the timing of change of the read memory indication signal shown in FIG. 4, for example.

FIG. 10 shows an example of the structure of the format change detecting circuit 34 in FIG. 6. The selector 50 in FIG. 10 outputs the output of the first or second memory property holding register 27 or 28 which is subjected to the write operation to the property signal converting circuit 51. The property signal converting circuit 51 outputs the value of PSTR to the D flip-flop 52 and the EXOR gate 60, the value of PSEQ to the D flip-flop 53 and the EXOR gate 61, the value of PFRM to the D flip-flop 54 and the EXOR gate 62, the value of FRC to the D flip-flop 55 and the EXOR gate 63, the signal SVSIZE to the AND gate 67, the value of RFF to the D flip-flop 56 and the EXOR gate 64, SIFMT1 to the D flip-flop 57 and the EXOR gate 65, and SIFMT2 to the D flip-flop 58 and the EXOR gate 66.

The EXOR gate 60 outputs the exclusive OR of the outputs of the property signal converting circuit 51 and the D flip-flop 52 to the OR gate 69. The EXOR gate 61 outputs the exclusive OR of the outputs of the property signal converting circuit 51 and the D flip-flop 53 to the OR gate 69. The EXOR gate 62 outputs the exclusive OR of the outputs of the property signal converting circuit 51 and the D flip-flop 54 to the OR gate 69. The EXOR gate 63 outputs the exclusive OR of the outputs of the property signal converting circuit 51 and the D flip-flop 55 to the OR gate 69.

The EXOR gate 64 outputs the exclusive OR of the outputs of the property signal converting circuit 51 and the D flip-flop 56 to the AND gate 67. The AND gate 67 outputs the AND of the output of the property signal converting circuit 51 and the output of the EXOR gate 64 to the OR gate 69.

The OR gate 69 outputs the OR of the outputs from the EXOR gates 60–63 and the output from the AND gate 67 to the OR gate 70.

The EXOR gate 65 outputs the exclusive OR of the outputs of the property signal converting circuit 51 and the D flip-flop 57 to the OR gate 68. The EXOR gate 66 outputs the exclusive OR of the outputs of the property signal converting circuit 51 and the D flip-flop 58 to the OR gate 68. The OR gate 68 outputs the OR of the outputs of the EXOR gates 65 and 66 to the OR gate 70.

The OR gate 70 outputs the OR of the outputs of the OR gates 68, 69 to the output circuit 71. The format change can be detected by detecting the output of the OR gate 70 at a high level. The signal SVSIZE is a signal converted in the property signal converting circuit 51. This signal indicates whether the number of scanning lines is 720 or not, which attains a high level only when it is 720. The signals SIFMT1 and SIFMT2 are also signals converted in the property signal converting circuit 51, which indicate the frame size. The 2-bit signals SIFMT1 and SIFMT2 express four kinds of frame sizes.

The output circuit 71 outputs the signal indicating the format change at the timing of change of the read memory indication signal.

Figure 11:
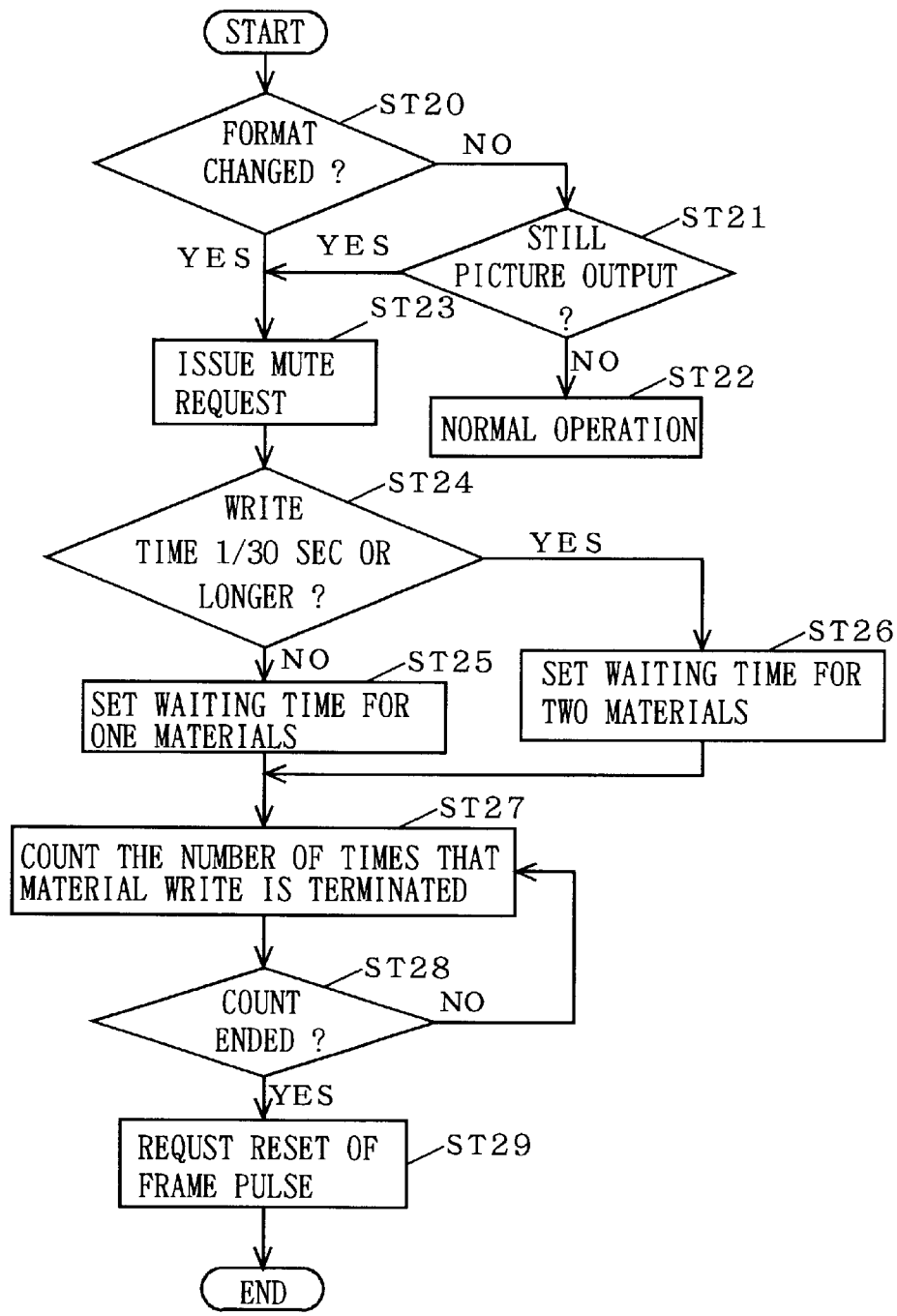
FIG. 11 is a flowchart illustrating the operation of the decoder when the still picture output or the format change is detected.

Next, processings conducted when the format is changed or when a still picture is outputted will be described referring to FIG. 11. In these cases, it is determined whether synchronization in the device is changed or the format change detecting circuit 34 has detected the format change (step ST20). If the format has not been changed, it is determined in step ST21 whether a still picture is being outputted. If a still picture is not being outputted, the flow moves to step ST22 to perform normal operation. If it is determined in step ST20 that the format has been changed, or if it is determined in step ST21 that a still picture is being outputted, a mute request is issued to set the monitor screen to a certain fixed value (step ST23). Next, it is determined whether a time of 1/30 of a second or longer is required as a write time in step ST24. When a time of 1/30 second or longer is required as the time for writing, the waiting time for mute is set to a time required to write video data of two materials (step ST25). If the time required for writing is smaller than 1/30 second, the waiting time for mute is set to a time required to write video data of one material (step ST26). The waiting time is changed depending on the write time because the time required for recovery from fluctuation of the PLL circuit making phase synchronization of the signals differs depending on the write time.

Next, in step ST27, the number of terminations of material writing is counted. Step ST28 determines whether the counting has been finished. When the counting operation has not been finished, the flow returns to step ST27 to continue the counting operation. When the counting operation is ended, a reset of the frame pulse of the CRT is requested in step ST29, for example, to end the series of processing of initializing the synchronization called "a format change."

Next, the irregular processing in which the field becomes discontinuous will be described. With monitors having an odd number of scanning lines, such as the HDTV monitor with 1125 scanning lines and the STDV with 525 scanning lines, the picture is normally formed in the sequence of 563→562→563 . . . , for example. If the sequence becomes 563→562→562 . . . , the synchronization must be re-established. This causes the irregular processing.

Figure 12:
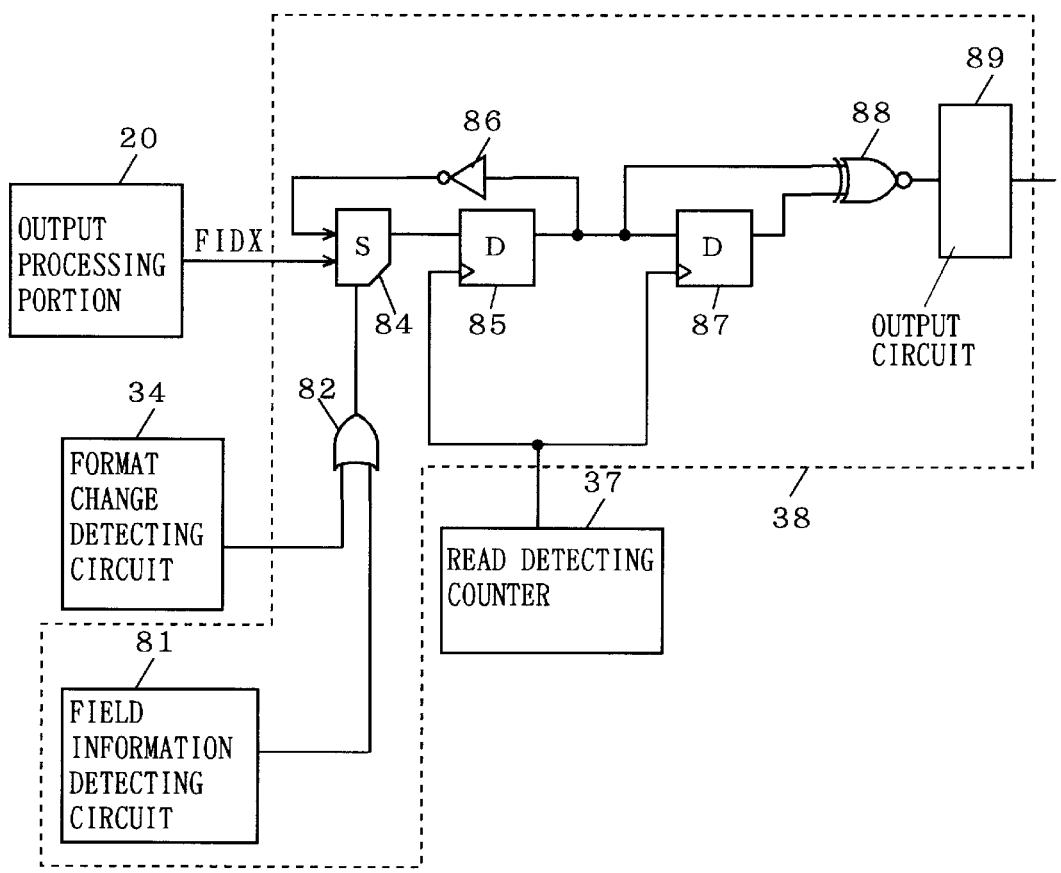
FIG. 12 is a circuit diagram showing the structure of the field discontinuity detecting circuit.

FIG. 12 is a block diagram showing a structure of a same field detecting circuit for detecting the field discontinuity. In FIG. 12, the format change detecting circuit 34 detects whether the condition corresponds to the format change. The field information detecting circuit 81 detects whether the data about the picture format includes information about the field. The field information detecting circuit 81 determines that the information about the field is included in the data about the picture format except when the value of PSEQ is "1" and the value of PFRM is "1" at the same time. The OR gate 82 outputs the OR of the output of the format change detecting circuit 34 and the output of the field information detecting circuit 81. The selector 84 switches the signal FIDX outputted from the first processing circuit 1 and the output from the inverter 86 according to the output of the OR gate 82. The signal FIDX is a signal for distinguishing between the even scanning line field (the top field) and the odd scanning line field (the bottom field). The D flip-flop 85 stores the output of the selector 84 in response to the read completion indication signal which the read detecting counter outputs when receiving the write completion indication signal outputted from the write termination detecting circuit 21, for example. The inverter 86 inverts the output of the D flip-flop 85 and provides the output to the selector 84. The D flip-flop 87 stores the output from the D flip-flop 85 in response to the write completion indication signal outputted from the write termination detecting circuit 21. The EXOR gate 88 outputs the exclusive OR of the outputs of the D flip-flops 85 and 87 to the output circuit 89. The output circuit 89 issues the mute request when the output of the EXOR gate 88 is at a high level to inform that a field discontinuity has occurred, so that part of the synchronizing signal is initialized.

When the field information is included in the data about the picture format or when the format change is performed, it is possible to detect whether the field is discontinuous. The field information detecting circuit 81 can deal with the cases where the field information is not included in the data about the picture format, and where the format change is made and the first data is to be inputted.

Figure 13:
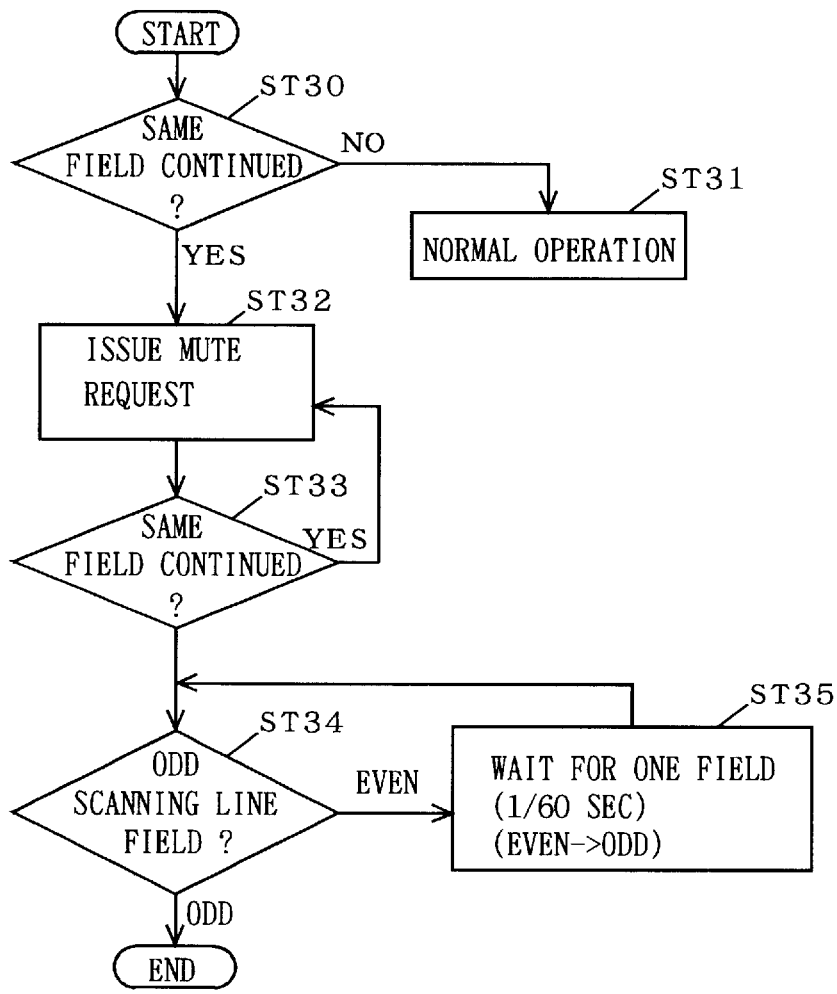
FIG. 13 is a flowchart illustrating the processing performed after the field discontinuity is detected.

FIG. 13 is a flowchart showing the procedure of the irregular processing with the field discontinuity. It is determined in step ST30 whether the same field has successively come. If the same field did not continue, normal operation is performed.

If the same field has continued, the flow moves to step ST32 to issue the mute request. Next, it moves to step ST33 to further determine whether the same field has continued. If the same field continuity occurs twice, the mute request is continuously issued. If it is determined in step ST33 that the same field is not continuing, the flow moves to step ST34 to determine whether it is the odd scanning line field. If it is the odd scanning line field, the processing is continued. If it is not the odd scanning line field, the process moves to step ST35, waits for one field, and moves to step ST34 to determine whether it corresponds to the odd scanning lines or in the even scanning lines.

Thus, the CRT 101 is not successively requested to process the same scanning lines, and the odd scanning line is always outputted first after initialization.

Although the read frequency is 60 Hz in the description of the preferred embodiment, other frequencies can be used.

In the description of the preferred embodiment above, the decoder 100 processes the packet data 102. However, the same effects as the preferred embodiment can be provided as long as the data has a format adapted to MPEG1 or MPEG2. Or, instead of the packet data directly transferred, data having a partially altered format may be used. For example, when the video signal is transferred in a plurality of packets, the data can be used for each frame.

In the preferred embodiment above, in the processing in which data about compressed video signal is converted into intermediate data from which the compression was eliminated and then the intermediate data is written into and read from the first and second video signal memories, the intermediate data was described by using the macro-block data. However, the raster data can be used as the intermediate data and the raster data may be written into and read from the first and second video signal memories. This provides the same effects as the preferred embodiment above.

While the invention has been described in detail, the foregoing description is in all aspects illustrative and not restrictive. It is understood that numerous other modifications and variations can be devised without departing from the scope of the invention.

What is claimed is:

1. A decoder for converting packet data into raster data, said packet data including first data about a picture-compressed video signal and second data about picture format including a picture rate, said decoder comprising:

a first processing means for receiving said packet data, for converting said first data into intermediate data, thereby eliminating picture compression from said first data, yielding data about an expanded picture video signal, and for outputting said intermediate data and said second data;

a second processing means for receiving said intermediate data and said second data from said first processing means and for processing said intermediate data to output raster data for one frame at a frequency equal to a frame frequency;

a storage means for storing said intermediate data for processing said intermediate data in said second processing means; and a write termination detecting means for counting a number of data in said intermediate data which are written into said storage means and for comparing an expected value of a number of data obtained from said second data with said counted number of data to detect a termination of writing of said intermediate data into said storage means;

wherein said second processing means writes said intermediate data into said storage means at a frequency equal to said picture rate and reads said raster data for one frame from said storage means at the frequency equal to said frame frequency;

wherein said storage means comprises a plurality of video signal memories, each capable of writing, or storing, said intermediate data for one frame;

wherein said intermediate data of different frames are stored into different ones of said video signal memories, and a write target video signal memory and a read target video signal memory are switched after a detection of a termination of writing intermediate data received from said first processing means into said storage means is confirmed;

wherein said write target video signal memory and said read target video signal memory are switched in response to the detection of the termination of writing by said write termination detecting means.

2. The decoder according to claim 1, wherein said first processing means outputs said intermediate data for one frame after outputting said second data for said one frame to said second processing means.

3. The decoder according to claim 1, wherein said storage means further comprises a plurality of property holding memories, corresponding to said plurality of video signal memories, for storing said second data, wherein said data about said picture format is written into said property holding memory related to said data about said expanded picture video signal of said intermediate data written into said corresponding video signal memory.

4. The decoder according to claim 3, further comprising a format change detecting means for comparing a plurality of said second data stored in said plurality of property holding memories to detect a format change in which successively transferred two pictures are treated as different sequences.

5. The decoder according to claim 4, further comprising first and second registers for holding field information indicating whether said intermediate data to be displayed corresponds to a top field or a bottom field, a comparison means for comparing field information stored in said first and second registers; and a field information detecting means for detecting that said field information is included in said second data, wherein:

when said intermediate data is being received from said first processing means and is being written into said storage means, and when said format change detecting means detects a format change or when said field information detecting means detects inclusion of said field information, said field information stored in said second register is shifted to said first register in response to a detection of a termination of writing by said write termination detecting means, and said field information obtained from said second data related to said data about said expanded picture video signal of said intermediate data received from said first processing means is stored into said second resister.

6. The decoder according to claim 1, further comprising:

a read detection counting means for counting a number of times that the same intermediate data is read from said storage means;

a read number expected value detecting means for detecting an expected value of a number of times that said intermediate data should be read in normal operation by using said second data related to said intermediate data; and a comparison means for comparing said expected value of the number of times that said intermediate data should be read which is detected by said read number expected value detecting means with an output of said read detection counting means.

* * * * *